United States Patent [19]
Appelberg et al.

[11] 3,987,351
[45] Oct. 19, 1976

[54] SYSTEM FOR ARRANGING THE OPERATIONS AND CONNECTIONS BETWEEN A COMPUTER LINKED TO A PROCESS AND A CONTROL STATION CONNECTED TO THE COMPUTER

[75] Inventors: Veikko Vilhelm Harald Appelberg; Veijo Sakari Heikkila, both of Tapiola, Finland

[73] Assignee: Outokumpu Oy, Helsinki, Finland

[22] Filed: Nov. 20, 1974

[21] Appl. No.: 525,630

Related U.S. Application Data

[63] Continuation-in-part of Ser. No. 384,199, July 31, 1973, abandoned.

[52] U.S. Cl. ............................ 318/591; 235/151.1; 340/172.5
[51] Int. Cl.² .................... G05B 9/00; G06F 15/46
[58] Field of Search ............... 340/172.5; 318/563, 318/564, 591; 235/153 AE, 151.1, 151.11, 151.12

[56] References Cited
UNITED STATES PATENTS

| | | | |
|---|---|---|---|
| 3,252,149 | 5/1966 | Weida | 340/172.5 |
| 3,377,623 | 4/1968 | Reut | 340/172.5 |
| 3,581,289 | 5/1971 | Wilhelm | 340/172.5 |
| 3,636,331 | 1/1972 | Amrehn | 340/172.5 |
| 3,741,246 | 6/1973 | Braytenbah | 340/172.5 |
| 3,896,871 | 7/1975 | Pecoraro | 318/591 |

*Primary Examiner*—Gareth D. Shaw
*Assistant Examiner*—James D. Thomas
*Attorney, Agent, or Firm*—Brooks Haidt Haffner & Delahunty

[57] ABSTRACT

A system for arrangement of operations and connections between a computer or the like involved with a process and a control station needed by the process operator for communication with the computer and for control of the process in case of failure in the computer operation, and for arrangement of the communication between these devices and the process, wherein there are parallel measurement signal channels leading from the process to the computer and the control station and, similarly, parallel control signal channels leading from said devices to the process, respectively, and wherein, additionally, the control station is provided with separate push buttons or the like for at least each measurement of interest, with which push buttons the display of the measurement signal as well as the corresponding control signal may be switched on to the control station, and with which a message concerning the selected measurement may be delivered to the computer.

2 Claims, 6 Drawing Figures

Fig. 5

| ZnEV-feed stream | ZnEV-surface level | ZnEV-air feed | ZnER-stream |
|---|---|---|---|
| ZnER-Cu-% | ZnER-Zn-% | ZnER-S-% | ZnER-Fe-% |

| ZnRV-surface level | ZnRV-air feed | ZnRR-stream | ZnRR-density |
|---|---|---|---|
| ZnRR-Cu-% | ZnRR-Zn-% | ZnRR-S-% | ZnRR-Fe-% |

| ZnV-NK-stream | ZnV-CuSO₄ | ZnV-feed Zn-% | ZnV-feed Fe-% |
|---|---|---|---|
| ZnV-feed Cu-% | ZnV-feed Zn-% | ZnV-feed S-% | ZnV-feed Fe-% | red ⊗ 1 white ⊗ 2 blue ⊗ 3

SYSTEM FOR ARRANGING THE OPERATIONS AND CONNECTIONS BETWEEN A COMPUTER LINKED TO A PROCESS AND A CONTROL STATION CONNECTED TO THE COMPUTER

CROSS-REFERENCE TO RELATED APPLICATION

This application is a Continuation-in-Part of our application Ser. No. 384,199 filed July 31, 1973 and now abandoned.

BACKGROUND OF THE INVENTION

1. Field of the Invention

The present invention relates to a system for arranging the operations and connections between a computer or a similar device which belongs to a process and a control station needed by the process operator for communicating with the computer or, if the computer breaks down, for linking these devices to the process and controlling it.

2. Description of the Prior Art

The conventional present-day systems in which a process is controlled by a computer have several deficiencies. Because of the relatively great unreliability of computers, stand-by controllers and back-up stations in which the control signals given by the computer are transformed into a form suitable for the actuators of the process and which can also work as reserve devices when the computer breaks down are normally used. These devices considerably increase the price of the control system. Another deficiency is that, to identify the measuring and control points, a code consisting of letters and numbers is used which the process operator must remember in order to obtain the data corresponding to a given measurement and control point from the computer. Thirdly, if the computer breaks down, the person responsible for process control may have to use controls which he need not use when the computer is in order, and therefore he cannot use them well enough. In addition, several computer-based process control systems have characteristics which are not at all necessary in all types of processes.

Consequently, it is desirable to eliminate the above disadvantages and to provide a system by which a process can be controlled simply when, for example, a computer breaks down and in which a separate stand-by controller or back-up station for manual process control is not needed for each actuator.

SUMMARY OF THE INVENTION

The present invention thus provides a system of the type already described, which comprises such connection of said computer and said control station that the measurement signals coming from the process are transferred to the computer and the control station concurrently in their entirety and, likewise, the signal channels necessary for controlling the operating devices of the process also lead from the computer and the control station to the process concurrently, and separate activating means, such as push buttons, for at least each measurement of interest provided at said control station for the switching of the display of the respective measurement signal and the corresponding control signal thereto and the delivering of a message concerning the selected measurement to the computer.

In a system according to this invention the information needed for the process control may be present, e.g., in a pulse length or pulse number form.

BRIEF DESCRIPTION OF THE DRAWINGS

FIG. 5 shows how the variable modules of FIG. 3 can be arranged into a uniform field.

DESCRIPTION OF THE PREFERRED EMBODIMENTS

Figure 1:
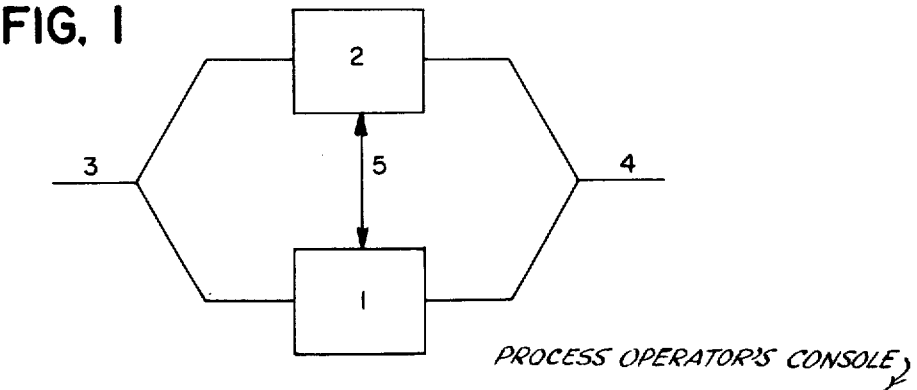
FIG. 1 is a block diagram which illustrates the principle of the system according to the invention.

In the block diagram shown in FIG. 1, number 1 refers to a computer or a similar device, such as a process computer. Number 2 refers to a control station. By means of control station 2, the person responsible for the process control communicates with the computer. It is essential to the system that the measurement signals coming from the process are transferred along line 3 concurrently to both the control station 2 and the computer 1. Likewise, the control signals departing for the process are transferred along line 4 concurrently from both the computer and the control station. The signals between the control station and the computer are transferred over line 5.

Figure 2:
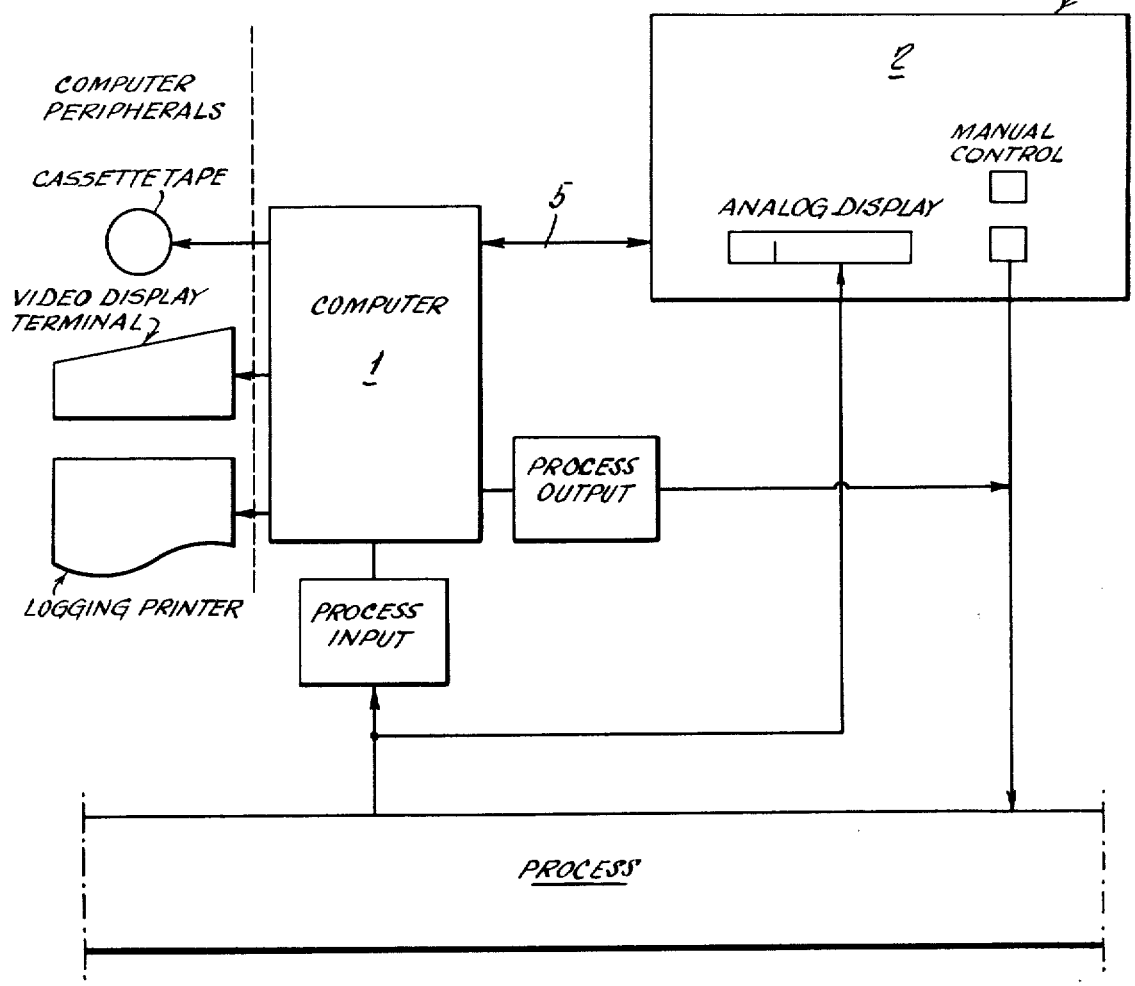
FIG. 2 shows a practical block diagram of the system according to the invention.

FIG. 2 is equivalent to FIG. 1. In FIG. 2, a system for realization of the principle shown in FIG. 1 is represented. The measurement lines 3 go in parallel both to the control computer 1 and to the operator's console 2. The control outputs go to the process via a line 4, which is common and parallel both to the control computer 1 and to the operator's console 2. For simplicity, only one measurement and control line is shown in FIG. 2. Multiple measurement and control is achieved using a multiplexing system, which is activated by a push-button in a process variable module, as is shown in FIG. 3.

Figure 3:
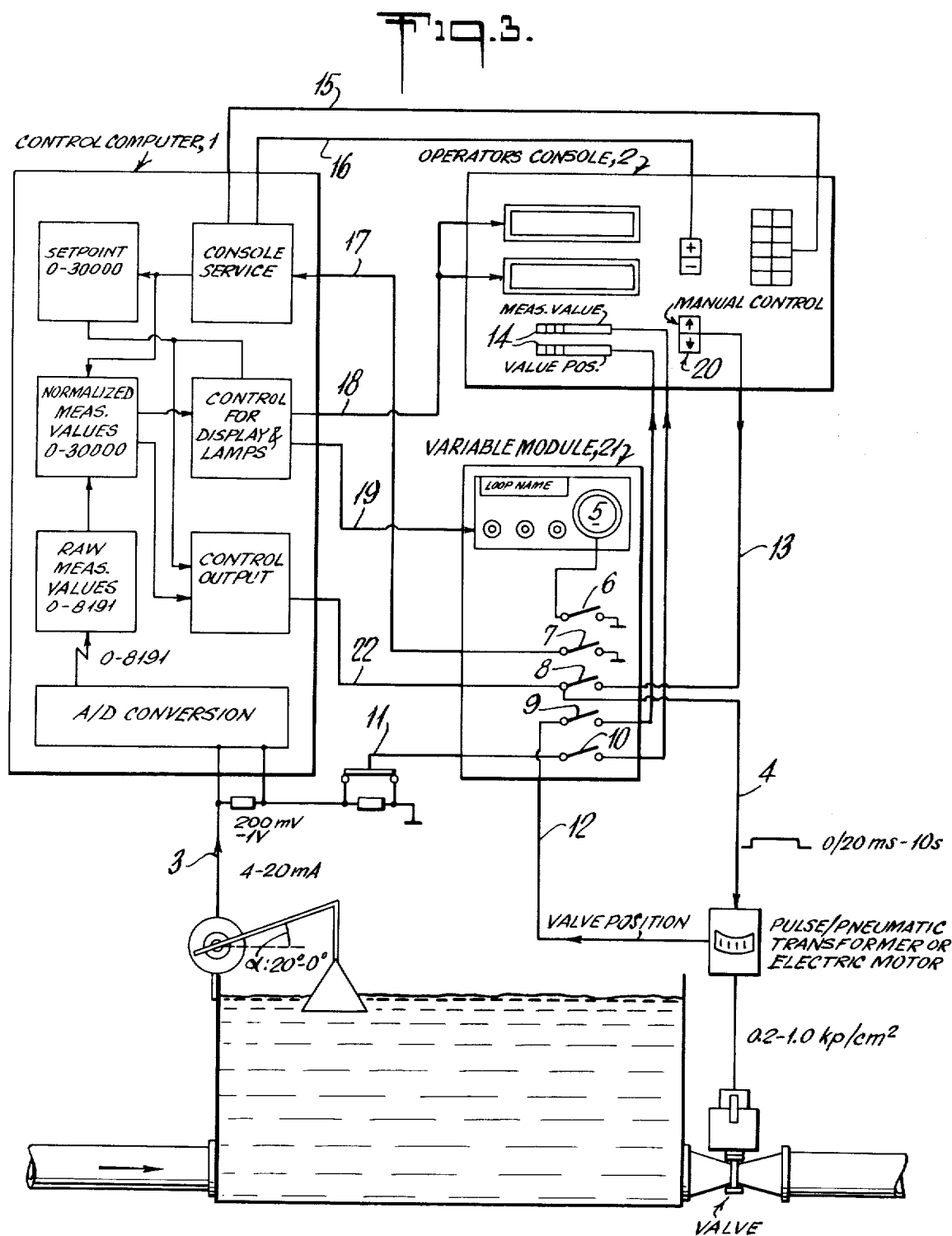
FIG. 3 shows connections relating to the system of the invention.

In FIG. 3, a more detailed diagram of the proposed system is presented. It should be noted that the diagram is only an example of how the system can be built. For example, solid state electronics could be used throughout the system instead of relays, as shown in the variable module 21.

When the push button 5 is pressed, the normally open switches 6, 7, 8, 9 and 10 close, making the necessary connections to connect the measurement line 11, the valve position line 12 and the control output lines 13 to the proper displays 14 and manual control buttons 20 in the operator's console 2.

Thus a certain process variable or process measurement is selected for inspection by the process operator's console 2. In FIG. 3 the name of the process variable can be written on the variable module 21 for ease of operation. For the selected process variable, the measurement signal 3 is fed both to the control computer 1, and to the process operator's console via lines 11 and 10, and via the variable module 21. Similarly, control signals 4 for controlling the process actuators are fed both from the computer 1 through the path 22, and from the process operator's console 2 through the path 13. Multiplexing of measurement and control signals for the computer 1 is done by the computer, as multiplexing of measurement and control signals for the process operator is done manually using the variable module 21. Signals for connecting the computer 1 and the process operator's console 2 are carried by function command lines 15, set point change lines 16, interrupt and address lines 17 for information about which process variable is selected, display drive lines 18, and alarm and loop status lines 19 for displaying information on variable modules 21.

Only one set of switches 6, 7, 8, 9 and 10 should be closed at a time. In a very simple way this could be accomplished by using no hold mechanics or circuitry connected to the push button 5. Thus the button 5 should be depressed manually all the time analogue measurement information 3 is desired on displays 14, and manual control output buttons 20 are desired to be connected to the control output lines 4. However, for convenience of operation, either a mechanical or an electrical holding system may be used in connection with the push-button 5. The circuitry or mechanical assembly to achieve this is not shown in FIG. 3 for simplicity of representation.

Figure 4:
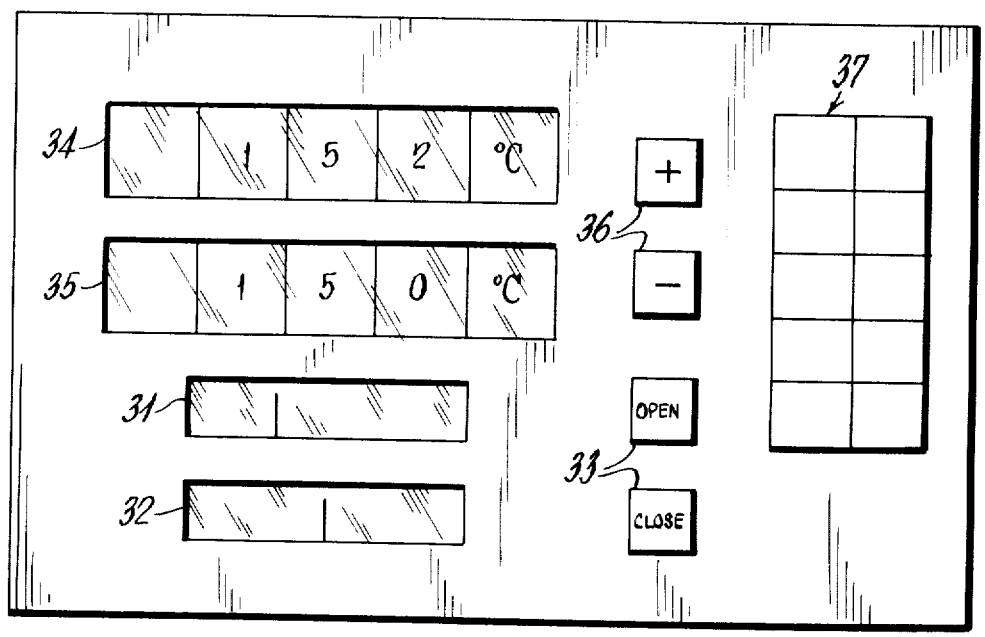
FIG. 4 shows the control station of FIG. 3 in greater detail.

A detailed example of the operator's console 2 of FIG. 2 is shown in FIG. 4.

In FIG. 4, the desired analogue measurement is displayed on device 31, and the corresponding valve position, in case of a control loop, is displayed on device 32, if desired. Push buttons 33 are for manual control of control output signals. Digital display 34 is connected to the computer, and the information displayed is the selected measurement value. This value is generated by the computer using the process measurement directly connected to the computer via its process interface. The display 35 is used for displaying the setpoint when a control loop is employed. Push buttons 36 are used for changing the setpoint value used by the computer for control algorithm calculations. Push buttons 37 are used for directing the computer to do some special functions, as for changing alarm limits, changing control loop status, and related other functions. The operation of displays 31, 32, 34 and 35 and push buttons 36 and 37 need not be explained in detail in order to understand the invention, since conventional equipment can be used. To achieve simple manual control, pulse duration or pulse number control signals should be used to control the process actuators. Thus, for example, by using pulse duration signals, the control output signals for manual control may be generated very simply by depressing the manual control buttons 20 shown in FIG. 3. When the system operates normally, data transmitted from the computer 1 (of FIG. 2) to the control station 2 along line 5 are used for the process control. However, while only one embodiment of the invention has been shown and described in detail, it will now be apparent to those skilled in the art that many modifications and variations may be made which do not depart from the spirit and scope of the invention.

For the selection of a measurement, the control station has a separate push button or the like for each measurement. The push buttons can be arranged appropriately in the order according to the process procedure. FIG. 5 shows as an example a push button panel of a control station linked to an ore concentration-flotation process. The importance of each push button and its effect on the process in question is, however, inessential in regard to the principle of the invention. Pushing a button causes the data concerning a measurement to be displayed at the actual control station, as illustrated in FIG. 4. Should the computer 1 break down, two sets of data are switched to the control station of FIG. 4 for display when the respective buttons are pushed. These are the measurement values of the desired quantity and the position of the respective operating member, in the control case. Further, in the control case, the manual control of the actuator is simultaneously switched on at the control station. In a special case, the actuator may be replaced by a control device in a so-called suspensory control. This has no essential importance in regard to the process control.

To facilitate control of the operating members by the system according to FIG. 1 in case the computer breaks down, certain requirements are set for the type of the control signal for the operating devices. The most natural method is to use an increment-form pulse length or pulse number signal (thus, not an absolute value signal). The control of the operating member can take place concurrently in its entirety either from the computer 1 or from the control station 2, illustrated in FIG. 2. Another advantage of the invention is that, when desired, an emergency control can also be connected to some operating member; this control can be, for example, of the type introduced in British Pat. No. 1,203,971.

Signal lights, etc., can be fitted in connection with the measurement selection push buttons for the purpose of giving an alarm, such as by the three lamps in the variable module 21 of FIG. 3. This facilitates process control since all the necessary data have been systematically grouped within the same area.

Figure 6:
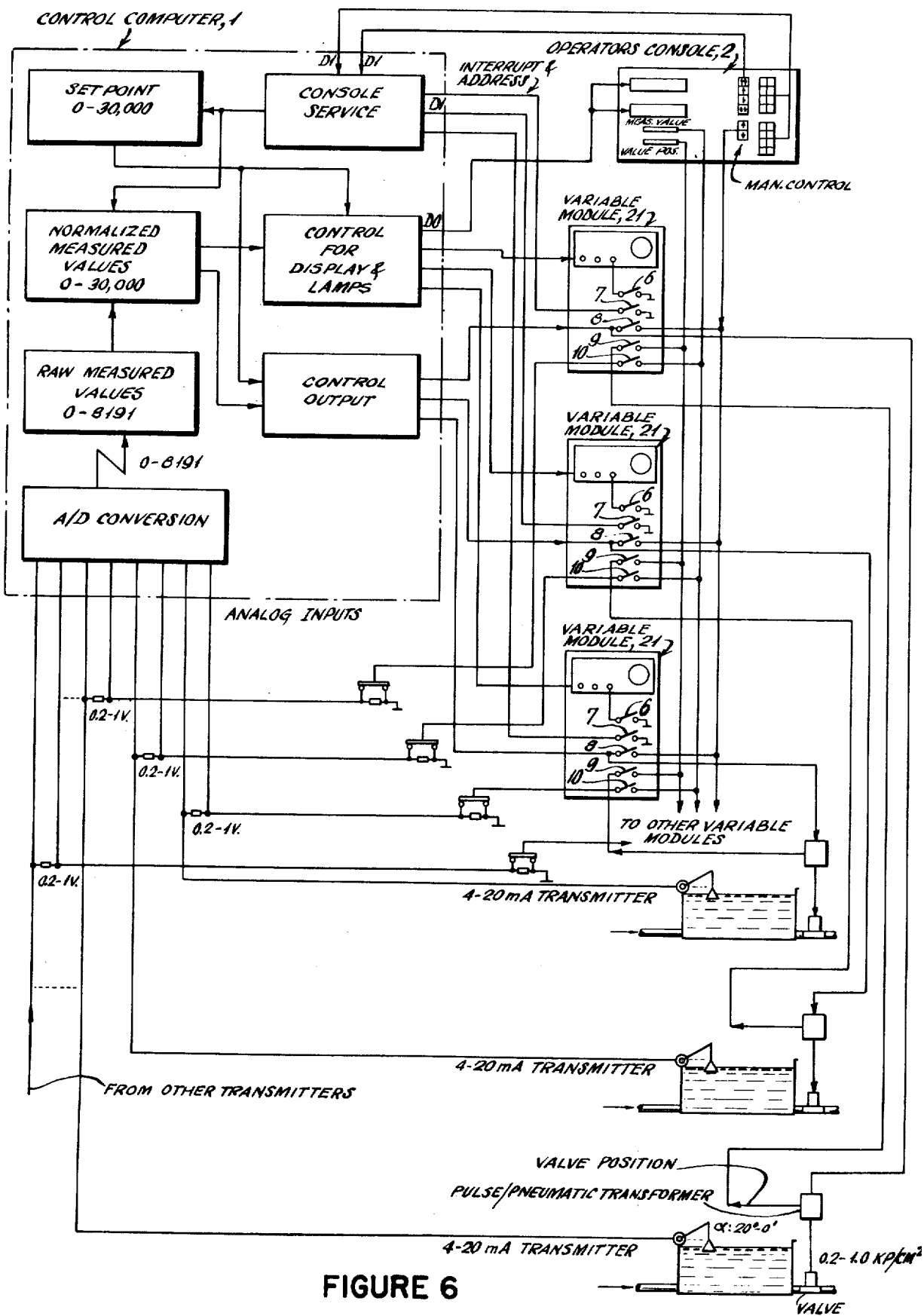
FIG. 6 shows an arrangement of three control loops in a system according to the invention.

FIG. 6 shows how more than one control loop can be effectively arranged in the system according to the invention. The main parts in FIG. 6 are the same as in FIG. 3, namely control computer 1, operator's console 2, variable modules 21, and a part of a process shown as flotation machines with level control instruments. In FIG. 6 three control loops are shown, but it is easy to see how the system can be expanded by adding variable modules and measurement signals from other transmitters.

FIG. 6 shows how all control loops in a system can receive their control signals at the same time from the digital output devices of the computer 1. The figure shows only three control outputs but it is appreciated that it is possible to have those outputs for other control loops, too. The measurement values from controlled variables are led in parallel to analog inputs of the computer.

The function of the variable module 21 has been described in connection with FIG. 3. FIG. 6 also shows how the variable modules 21 are connected parallel to operator's console 2. This is made possible by either mechanical or electrical means preventing the actuation of more than one variable module at a given time. Thus it is possible to have manual control for back up purposes for all control loops by means of the operator's console 2. However, only one control loop can be handled at a time.

What is claimed is:

1. A system for arranging the operations and interconnections between a computer linked to a process and a control station needed by the process operator to communicate with the computer and to control the process if the computer breaks down, and for connecting these devices to the process, including means connecting the process to the computer and the control station for transferring measurement signals coming from the process concurrently and in their entirety to both the computer and the control station, signal channels from the computer and the control station for controlling the operating devices of the process likewise leading concurrently from the computer and the control station to the process, push button type activating means at said control station for at least each measurement of interest operative to activate means for the switching on of a display of the respective measurement signal and the control signal corresponding to said measurement signal, means for delivering a message concerning the selected measurement to the computer and manual control means at said control station connected by control lines to said operating devices of the process for direct manual control of the process when the computer breaks down.

2. The system according to claim 1 wherein the manual control means comprises at least one control button for generating a pulse signal having a duration equal to the length of time that the button is depressed, and said operating devices are responsive to the said duration of the pulse signal.

* * * * *

UNITED STATES PATENT AND TRADEMARK OFFICE
CERTIFICATE OF CORRECTION

PATENT NO. : 3,987,351
DATED : October 26, 1976
INVENTOR(S) : Appelberg et al

It is certified that error appears in the above—identified patent and that said Letters Patent are hereby corrected as shown below:

Insert Identification No.:

--[30]   Foreign Application Priority Data

Aug. 4, 1972      Finland.............2181/72--

Signed and Sealed this

Twenty-eighth Day of December 1976

[SEAL]

Attest:

RUTH C. MASON
*Attesting Officer*

C. MARSHALL DANN
*Commissioner of Patents and Trademarks*